(12) United States Patent
Smith et al.

(10) Patent No.: US 12,121,815 B2
(45) Date of Patent: Oct. 22, 2024

(54) SYSTEM AND METHOD FOR INCENTIVIZING USER PARTICIPATION IN VIDEO GAMES

(71) Applicant: GoldenGoalGames LLC, Bellevue, WA (US)

(72) Inventors: John Smith, Bellevue, WA (US); Stephen Cartwright, Samammish, WA (US); Jordan Massey, Bellevue, WA (US); Gordon Grove, San Francisco, CA (US)

(*) Notice: Subject to any disclaimer, the term of this patent is extended or adjusted under 35 U.S.C. 154(b) by 0 days.

(21) Appl. No.: 17/491,428

(22) Filed: Sep. 30, 2021

(65) Prior Publication Data
US 2023/0101707 A1    Mar. 30, 2023

(51) Int. Cl.
*A63F 13/00* (2014.01)
*A63F 13/45* (2014.01)
*A63F 13/65* (2014.01)
*A63F 13/69* (2014.01)
*A63F 13/792* (2014.01)

(52) U.S. Cl.
CPC .............. *A63F 13/69* (2014.09); *A63F 13/45* (2014.09); *A63F 13/65* (2014.09); *A63F 13/792* (2014.09)

(58) Field of Classification Search
CPC ...................... A63F 2300/407; A63F 2300/69
See application file for complete search history.

(56) References Cited

U.S. PATENT DOCUMENTS

| 9,704,174 | B1* | 7/2017 | McGhie ............... G06Q 20/387 |
| 2016/0048864 | A1* | 2/2016 | Beer .................. G06Q 30/0226 705/14.27 |
| 2016/0162882 | A1* | 6/2016 | McClung, III ....... G06Q 20/352 705/41 |

OTHER PUBLICATIONS

"Madden School" https://www.madden-school.com/pack-odds-will-disclosed-madden-19-ultimate-team/ (Year: 2019).*

* cited by examiner

*Primary Examiner* — David L Lewis
*Assistant Examiner* — Eric M Thomas
(74) *Attorney, Agent, or Firm* — Cesari and McKenna, LLP

(57) ABSTRACT

A system and method for maintaining and increasing the engagement of video game users is disclosed by providing a virtual container mechanism that modifies the game progress of all users after the occurrence of a game event. The system may provide repeated opportunities, with virtual items awarded through virtual containers, to achieve success for the lifetime of the video game. The system may further mitigate the fear of new users encountering veteran users in a game, while creating repeated engagement opportunities for veteran players.

20 Claims, 3 Drawing Sheets

SYSTEM AND METHOD FOR INCENTIVIZING USER PARTICIPATION IN VIDEO GAMES

BACKGROUND

The proliferation of video games across all video game platforms (e.g., gaming consoles, online distribution services, mobile devices, personal computers) has brought the proliferation of virtual containers (e.g., loot boxes, mystery boxes, gacha, card packs, prize wheels) as a method of encouraging user engagement or participation in video games. During gameplay, many video games present an opportunity for the user to activate (e.g., open a box, open a card pack, pick a card, stop a prize wheel) a virtual container. Once activated, the virtual containers often award the user with a virtual item that impacts the user's experience of the video game. Such virtual items may affect the user's experience in any number of ways. These virtual items, for example, may improve the appearance of a user's avatar or improve the user's ability to successfully compete within the video game. In many cases, users activate virtual containers to progress within the video game, to better compete with other users in the game, or some combination of both.

Conventional virtual container mechanics are profitable for game developers in part because they encourage increased investment of time and energy from players. For example, the mechanics usually award high-value virtual items with very low probability, providing a massive competitive advantage to users in possession of that virtual item. To maintain competitive parity with those users with a massive advantage, other users feel pressure to repeatedly purchase virtual containers until they receive that high-value virtual item, or they feel the pressure to pay a premium for virtual containers that offer a high probability of awarding that virtual item. Such purchases can involve in-game currency and/or real-world currency. The pressure to pay-to-play just to remain competitive dissuades many users from continuous engagement in a video game. Further, for massively multi-player games that have been on the market months or years, many veteran users of those video games have acquired many advantageous high-value virtual items so that newcomers find it nearly impossible to successfully compete against those veterans. This dynamic may discourage new users from committing the time, energy, and, often, money required to become adept at a video game. Several ideas (e.g., using matchmaking algorithms to group users of similar levels, removing the link between money and game progression) have been implemented to mitigate this issue, but they have been far from satisfactory.

SUMMARY OF THE INVENTION

There is a need for a novel system and method for incentivizing user participation in a video game.

According to one embodiment, a system for incentivizing user participation in a video game comprises at least one processor and at least one memory, wherein the processor is configured by machine-readable instructions to present a first virtual container that awards a user at least one virtual item from a first set of virtual items. Each virtual item in the first set comprises a probability that each virtual item will be awarded to the user according to a first probability distribution. Then after a game event, which may be based on a criterion suitable to the video game, the system presents a second virtual container that awards the user at least one virtual item from a second set of virtual items, where each virtual item in the second set comprises a probability that each virtual item will be awarded to the user according to a second probability distribution.

According to another embodiment, a method for incentivizing user participation in a video game comprises presenting, by at least one processor, a first virtual container that awards a user at least one virtual item from a first set of virtual items, wherein each virtual item in the first set comprises a probability that each virtual item will be awarded to the user according to a first probability distribution. Then presenting, after a game event, a second virtual container that awards the user at least one virtual item from a second set of virtual items, wherein each virtual item in the second set comprises a probability that each virtual item will be awarded to the user to a second probability distribution.

BRIEF DESCRIPTION OF THE DRAWINGS

The embodiments of the invention are illustrated by way of example, and not by way of limitation, in the figures of the accompanying drawings.

DETAILED DESCRIPTION

Examples of a system and method for incentivizing user participation in a video game are disclosed. In the following description, for purposes of explanation, numerous specific details are set forth in order to provide a thorough understanding of the embodiments of the invention. It is apparent, however, to one skilled in the art that the embodiments of the invention may be practiced without these specific details or with an equivalent arrangement. It is also apparent that other embodiments of the invention may be implemented in other types of games such as physical board games, or games that incorporate both physical and digital elements. In other instances, well-known structures and devices are shown in block diagram form to avoid unnecessarily obscuring the embodiments of the invention.

Although conventional virtual container mechanics are popular among game developers because they are profitable, an improved virtual container system may better promote player engagement and fun by mitigating the fear of new players encountering veteran players, while creating ongoing or repeated engagement opportunities for veteran players as well. Some conventional virtual container mechanics have been compared to gambling, because players often invest in-game or real-world currency into virtual containers that have only a low probability of yielding rewards that players would value, and once the currency is invested and the container is opened, the container is removed from the player's inventory and thus effectively loses all value, as it is replaced by the items from inside the container. This may be a disappointing outcome for the player, when the container is revealed to have only contained low-value items, and the player may come to view their investments of in-game or real-world currency as wasted. This, in turn, disincentivizes long-term player engagement and user loyalty. Moreover, players do not consider such disappointing investments of currency to be fun. In an example embodiment of an improved virtual container system, a player may retain a virtual container after opening it, or the player's virtual container may be replaced by a second virtual container, for example, periodically or in response to an in-game event. Thus, in an example embodiment, the player may reopen the same virtual container more than once or may open multiple virtual containers periodically as long as the player remains engaged with the game. Thus, the player's investment of in-game or real-world currency may lead to repeated engagement opportunities over time, rather than only one engagement opportunity, making it less likely that the player will come to view their investments as wasted. Also, because the player may retain and repeatedly experience the value of their virtual container purchase, the purchase mechanic is less like gambling.

Figure 1:
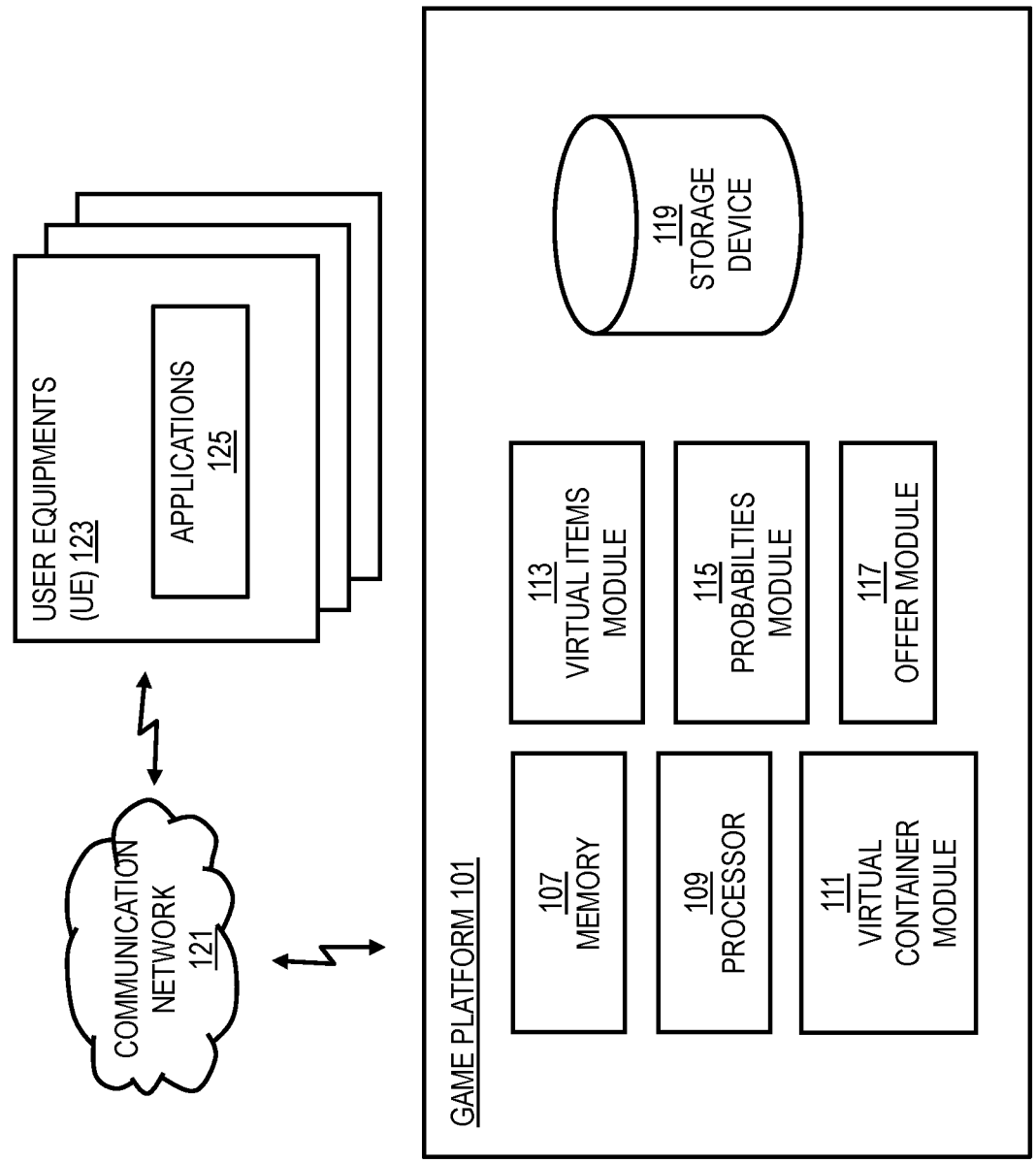
FIG. 1 depicts, in part, a system including a game platform according to an embodiment.

FIG. 1 depicts a system for incentivizing user participation in a video game. According to an embodiment, a video game may comprise any type of game (e.g., crypto games, non-fungible token (NFT) games, blockchain games, virtual trading card games, virtual reality games, augmented reality games, mobile games, board games, computer games, electronic games, arcade games, console games, game apps). As used herein, the term "e.g." means "such as, but not limited to" or "for example" and includes alternatives that would be apparent to a person of ordinary skill in the art, even if those alternatives are not expressly recited. The video game may be entirely digital (e.g., computerized, virtual, web-based, PC-based, console-based, and cloud-based) or include a hybrid of physical and digital elements (e.g., virtual reality, augmented reality, voice recognition, facial recognition, gesture recognition, and gaze tracking). The system, according to an embodiment, may be applied to any video game genre (e.g., role-playing game (RPG), first-person shooter (FPS), massively multiplayer online games (MMO), cooperative games, player versus environment (PvE), player versus player (PvP), strategy, sports, simulation, role-playing, racing, puzzle, fighting, adventure, action, fantasy, battle chess, auto-battler, and battle royale).

The game platform 101 includes one or more components for hosting a video game according to an embodiment. The game platform 101 includes a memory 107, processor 109, virtual container module 111, virtual items module 113, probabilities module 115, offer module 117, and storage device 119. It is contemplated that the functions of these modules and components 107-119 may be combined in one or more components or performed by other components of equivalent functionality. An individual module or component 107-119 may be in data communication with at least one other module or component. In another embodiment, all modules and components 107-119 are in data communication to each other directly or indirectly. In another instance, one or more of modules and components 111-119 may be implemented as a cloud-based service, local service, native application, or a combination thereof. The above-presented modules and components of game platform 101 can be implemented in hardware, firmware, software, or a combination thereof.

According to the embodiment shown in FIG. 1, the game platform 101 comprises a virtual container module 111. The virtual container module 111 may be configured to determine at least one virtual container the game platform 101 presents to the user in one or more instances of a video game. In an embodiment, a virtual container includes any aspect of a video game configured to conceal, reveal, and award a virtual item to the user. In an implementation, the virtual container module 111 may be configured to associate a set of virtual items with a virtual container. The virtual container module 111 in certain embodiments may be configured to determine and store a virtual container inventory associated with the user (user virtual inventory). In a non-limiting example, if a user chooses not to activate one or more offered virtual containers, the offer module 117 may determine a virtual container inventory that comprises the user's unactivated virtual containers. According to some embodiments, a user activates a virtual container by using a user interface to select (e.g., click on, tap, touch, circle) a visual representation of the virtual container as presented in the user interface. The offer module 117 may store the virtual container inventory in memory 107, storage device 119, or a combination thereof.

In FIG. 1, the game platform 111 comprises a virtual items module 113 according to an embodiment. The virtual items module 111 may be configured to store a set of virtual items that may be awarded to the user through the activation of a virtual container. In a further embodiment, the virtual items module 113 may be configured to determine a first, or current, set of virtual items from which a virtual item may be awarded to the user upon activating a first, or current, virtual container. The virtual items module 113 may further be configured to determine a second, or subsequent, set of virtual items from which a virtual item may be awarded to the user upon activating a second, or subsequent, virtual container. In some embodiments, the second set of virtual items replaces, entirely or in part, the virtual items contained in the first set. In certain embodiments, the second set of virtual items may be identical to the first set of virtual items. In yet other embodiments, the second set of virtual items supplements the first set of virtual items. The game platform 101 may present the second virtual container to the user after a period, with the period being defined by a criterion suited to the video game. Example criteria may include, but are not limited to, the real-world time, an achievement reached during gameplay, a number of instances of activating a virtual container, a promotional event, a charitable event, or the occurrence of a milestone. Exemplary milestones may include, but are not limited to, the beginning or conclusion of a season of play, a holiday, or an anniversary date, such as the anniversary date of the user joining the game or the anniversary date of the user acquiring the virtual container. In another embodiment, the game platform 101 may present the second virtual container to the user with the occurrence of an event or game event (e.g., a game event, completion of a real-world time period, end of a period, completion of an in-game time period, an end to a season, debut of an expansion pack of virtual items, debut of new major video game content). In some embodiments, the completion of a period coincides with the occurrence of an event.

By way of non-limiting example, a video game that involves soccer matches may involve a period called soccer seasons, whereby at the close of one soccer season, a next soccer season begins, and at the beginning of that new soccer season, a second virtual container is presented to the user. The soccer season may be defined by suitable criteria (e.g., some real-world time period, the length of a real-world soccer season, a given number of soccer matches played, playing a last playoff match). In an embodiment, an event or game event may include the conclusion of a soccer season. According to an embodiment, the game platform 101 further accommodates one or more users competing against the user (competing users), and presents to the competing users, after completion of the period, a virtual container identical to the second virtual container presented to the user.

In another instance, the virtual items module 113 is configured to assign a value or grade to each virtual item. In certain embodiments, the probability of a user receiving a virtual item decreases as the item's value increases. The value or grade of a virtual item may be associated with any type of criterion that potentially affects a user's experience of a video game. Example criteria may include, but are not limited to, in-game currency price, real-world currency price, in-game market value, real-world market value, attack ability, defense ability, speed ability, item rarity, level of armor, attractiveness, amount and/or quality of items in the user's inventory, rarity, real-world time, the activation of a promotional period, or the activation of an in-game feature affecting virtual item probabilities, such as a user activating an optional charitable contribution associated with each of the user's in-game purchases with real-world currency. The criterion that potentially affects a user's experience of the video game may also be a combination of more than one criteria.

The virtual items module 113 may be configured to associate the value of a virtual item with a type of coefficient, weight, grade, score, or other suitable value. By way of non-limiting example, virtual items may comprise virtual characters or representations of people, such as users, fictional people, athletes, celebrities, mythical creatures, real-world animals, or some combination thereof. Exemplary virtual items may further include, without limitation, representations of objects such as cards, clothing, gems, points, weapons, consumables, flags, flair, or armor. Still further exemplary virtual items may include, without limitation, upgrades such as special abilities, power-ups, user interface aesthetics, or increased power caps.

In some embodiments, the virtual items module 113 is configured to assign multiple values to each virtual item. In one non-limiting example, a video game involves the management of a soccer team and a virtual item type comprises a head coach. Therefore, the virtual items module 113 may associate multiple values to the head coach because of the multiple characteristics of each head coach. For example, the values may comprise a score that reflects that head coach's level of patience, leadership ability, communication skills, passion, perseverance, optimism, imagination, defensive tactics, attacking tactics, coaching experience, playbook, or some combination thereof.

In some embodiments, the virtual items module 113 may be configured to determine a second set of virtual items identical to a first set of virtual items except that the values associated with the virtual items of the second set have been configured to differ from the values associated with those of the first set. For example, in one embodiment, when the first set of virtual items includes a coach, the second set of virtual items also includes a coach. That second coach may be the same as the first coach, but with updated values. Thus, the coach with updated values may reflect the coach's corresponding and changing real-world performance over time. Alternatively, the second coach may be a different coach. Thus, in the example embodiment where a user's coach is removed at the end of a season, the user is guaranteed to get at least one replacement coach from the second set of virtual items when the user opens the second virtual container.

According to an embodiment, the game platform 101 may be configured to associate a user with an inventory of virtual items, wherein the user inventory may be stored in memory 107, virtual items module 113, user equipment (UE) 123, applications 125, or some combination thereof. A user inventory may comprise a database of virtual items awarded to the user. In an embodiment, such a database may reflect the quantities of each virtual item, the value of each virtual item or a combination thereof. In some embodiments, the user may be required to activate a virtual item to allow the game platform 101 to store the virtual item in a user inventory. According to some embodiments, a user activates a virtual item by using a user interface to select (e.g., click on, tap, touch, circle) a visual representation of the virtual item as presented in the user interface. In one embodiment of a multiplayer game, when the user activates the virtual item, that item is removed from the list of virtual items available to other users from other virtual containers, effectively making that virtual item unique. In that embodiment, the virtual item may be unique among all users. Alternatively, users may be grouped into subsets, such as a league, tournament, or rating bracket, and the virtual item may be unique only among users within the same subset. In another embodiment, individual virtual items may be associated with a non-fungible token (NFT) to accentuate and authenticate the virtual item's uniqueness and/or to make the item tradeable or collectible.

By way of non-limiting example, a soccer-themed video game provides an opportunity to the user to activate ten virtual containers, each virtual container being presented to the user as a virtual card pack containing three virtual items in the form of cards. Each of the cards resemble a real-world trading card and represent a soccer head coach with a single value. After activating the virtual card packs, the user is awarded thirty virtual items—thirty cards representing thirty head soccer coaches. In this non-limiting example, the game platform 101 then configures a user inventory that comprises those cards, indicating their quantity as well as their values, which in some scenario might be: 1 legendary, 5 rare, 4 uncommon, and 20 common coaches.

According to an embodiment, the game platform 101 may increase, decrease, replenish, or exhaust the quantities of virtual items in a user inventory in response to an aspect of the gameplay (e.g., the user reaching an achievement in the game, the user activating a virtual item, the user not activating a virtual item, another user obtaining the virtual item, the video game rebalancing user inventories, the ending of an in-game special event or tournament). The game platform 101 may further be configured to change or replace a virtual item in response to an aspect of the gameplay. Further, the game platform 101 may be configured to change the value of at least one of the virtual items in a user inventory in response to an aspect of the gameplay.

According to an embodiment, the game platform 101 comprises a probabilities module 115. The probabilities module 115 may be configured to determine a probability distribution comprising the probabilities of awarding each virtual item to a user. The probabilities module 115 may further be configured to determine a value probability distribution comprising the probabilities of a user being awarded any item of a particular value. The probabilities module may also be configured to determine an item-value probability distribution comprising the probabilities of a user being awarded a specific item of particular value. In another embodiment, the probabilities module 115 may further be configured to determine a first, or current, probability distribution for all virtual items contained in a first, or current, set of virtual items. The probabilities module 115 may also be configured to determine a second, or subsequent, probability distribution for all virtual items contained in a second, or subsequent, set of virtual items. In an embodiment, the probability distributions may change in response to gameplay. By way of non-limiting example, a probability distribution may change when, after awarding to a user a virtual item, the probabilities module 115 lowers the probability of awarding that virtual item a second time.

According to an embodiment, the probabilities module 115 may determine the second probability distribution following a period, wherein the period may be defined by a criterion suited to the video game (e.g., real-world time, a milestone reached during gameplay, a number of instances of redeeming a virtual container, etc.). In another embodiment, the probabilities module 115 may determine the second probability distribution at the occurrence of an event or game event (e.g., a game event, completion of a real-world time period, end of a period, completion of an in-game time period, an end to a season, debut of an expansion pack of virtual items, debut of new major video game content). In some embodiments, the completion of a period coincides with the occurrence of an event.

By way of a non-limiting example, a video game that involves soccer matches may comprise a period called soccer seasons, whereby at the end of one soccer season, a new soccer season begins, and at the beginning that new soccer season, the probabilities module 115 may determine a second probability distribution for a second set of virtual items. According to an embodiment, the second probability distribution is identical to the first probability distribution. In an alternative embodiment, the second probability distribution is different from the first probability distribution. The soccer season, according to just one non-limiting example, may be defined by suitable criteria (e.g., some real-world time period, the length of a real-world soccer season, a given number of soccer matches played, playing a last playoff match).

According to an embodiment, the probabilities module 115 may be configured to disclose the probability of being awarded a type and/or grade of virtual item by a virtual container before the user activates that virtual container. The probabilities module 115 may also be configured to change the probability that a virtual container will award the user with a particular virtual item based on the results of previous activations of virtual containers. By way of non-limiting example, if the game platform 101 awards a user a low-value virtual item through a virtual container, the probabilities module 115 may increase the probability of the user obtaining a higher-value virtual item on a subsequent activation of a virtual container. In that example, the probability may rise to as high as one hundred percent after a certain number of activations, to guarantee that the user will receive at least one higher-value virtual item after a certain number of activations. In another embodiment, the probabilities module 115 may be configured to increase the user's probability of receiving a particular virtual item with each activation of a virtual container until the game platform 101 awards that virtual item to the user. At that time, the probabilities module 115 resets the probability of awarding that virtual item. In yet another embodiment, the game platform 101 may be configured to determine a preset order to award virtual items in a series of virtual container activations. In an implementation, the series of virtual container activations may occur between the presentation of first and second virtual containers, may comprise the presentation of first and second virtual containers, or a combination thereof.

According to the embodiment, the game platform 101 comprises an offer module 117. The offer module 117 may be configured to present offers to accept or purchase virtual containers through an interface such as an in-game store. Such offers may include the opportunity to activate a virtual container to reward the user for attaining a particular achievement. In one such implementation, an offer module 117 may allow a user to accept and activate a virtual container after the user has won a soccer match. The offer module 117 in certain embodiments, may be configured to determine a user virtual container inventory. As a non-limiting example, if a user chooses not to activate one or more offered virtual containers and its associated virtual items, the offer module 117 may determine a user virtual container inventory that comprises the user's unactivated virtual containers. The offer module 117 may store the user virtual container inventory in memory 107, storage device 119, or a combination thereof.

In a non-limiting example, a game platform is configured to run an online multiplayer video game centered on the experience of operating a fantasy soccer team within a fantasy soccer league. For the gameplay, multiple online players, or users, participate by beginning a soccer season, a period, in the same position—with no soccer players. In assembling the soccer team, the game platform and/or offer module is configured to present to each user one opportunity to purchase a virtual container for some amount of in-game or real-world currency. The game platform configures each virtual container to appear as a virtual card pack, with each pack hiding 30 virtual items in the form of virtual cards, each virtual card representing a unique fantasy soccer player. Once the user activates the virtual card pack, the game platform awards the user 30 virtual cards, each representing a virtual soccer player with at least two associated values—position and grade. The probabilities module may be configured determine an item-value probability distribution to award each user virtual soccer players with roughly equivalent item quantities and values, or roughly the equivalent number of positions and grades as another user. Further, for purposes of this non-limiting example, the virtual soccer players come from a first set of virtual items shared by all users. Therefore, when one user is awarded a particular virtual soccer player, no other user may be awarded that virtual soccer player. Each user is in this embodiment is awarded 4 goalkeepers, 10 defenders, 9 midfielders, and 7 forwards. The users then embark on a virtual soccer season, managing their team roster in an effort to win as many soccer games as possible against the teams of other users. At the conclusion of the virtual soccer season, which the game platform may be configured to recognize as a game event, the game platform removes all players from every user's team so that users begin the next virtual soccer season anew and are required to purchase a second virtual card pack, again with the probabilities module configured to award each user nearly the same number of positions and grades of virtual items as another user. Alternatively, at the conclusion of the virtual soccer season, which the game platform may be configured to recognize as a game event, the game platform removes all players from every user's team and awards 30 new virtual cards to each user at the beginning of the next season, without the users having to pay for them again. This action resets the game progress of all users. This system allows users to earn highly valuable virtual items each time the soccer season resets and creates a gaming environment where the purchase of a virtual container that awards a less-than average team roster allows a user to experience that as a temporary setback rather than a more significant or permanent disadvantage. This system further creates a major engagement, re-engagement, or re-acquisition event every soccer season. In other embodiments, with a new soccer season, the game platform may rebalance, reset, or change the values for each virtual soccer player in order to change the gameplay strategy, creating another point of novelty to the game.

Figure 2:
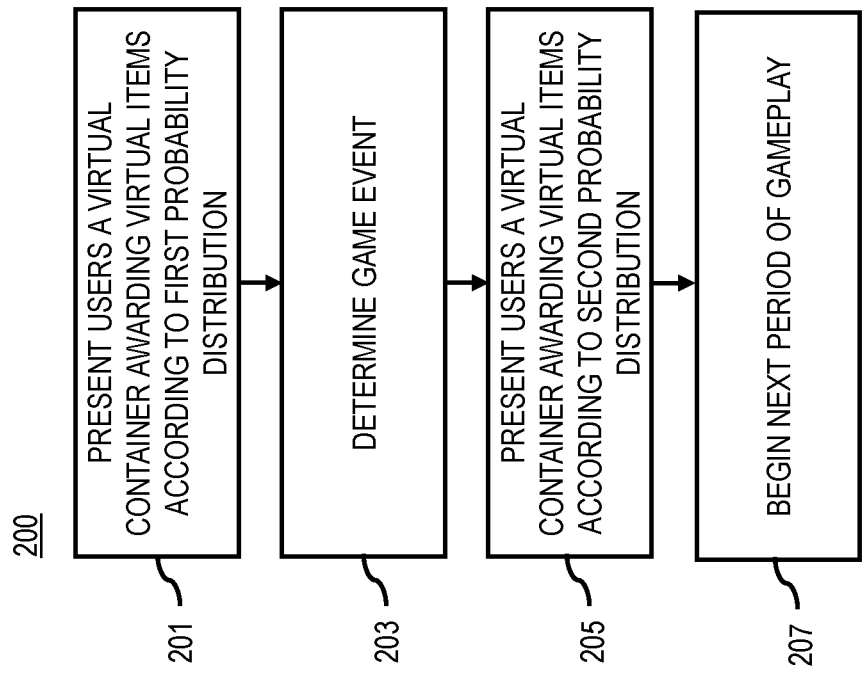
FIG. 2 depicts, in part, a method for presenting users with virtual containers according to an embodiment.

FIG. 2 is a flowchart of a process for incentivizing user participation in a video game. In various embodiments, game platform 101, memory 107, processor 109, virtual container module 111, virtual items module 113, probabilities module 115, offer module 117, storage device 119, alone or in combination, may perform one or more portions of process 200 and may be implemented in, for instance, a chip set including a processor and memory. As such, game platform 101, memory 107, processor 109, virtual container module 111, virtual items module 113, probabilities module 115, offer module 117, storage device 119 and/or any of their component modules can provide means for accomplishing embodiments of other processes described herein in conjunction with other components of system 100. In addition, embodiments describing functions/actions related to game platform 101, memory 107, processor 109, virtual container module 111, virtual items module 113, probabilities module 115, offer module 117, storage device 119 individually is equally applicable to the other. Although process 200 is illustrated and described as a sequence of steps, it is contemplated that various embodiments of process 200 may be performed in any order or combination, may include additional steps, and need not include all of the illustrated steps.

In step 201, the game platform 101 presents to the user a virtual container according to an embodiment. When activated, the virtual container awards the user with a virtual item according to a first probability distribution comprising each probability that the user will obtain each virtual item. The first probability distribution is determined by the probabilities module 115 and may be stored in memory 107. The game platform 101 awards the virtual item from a complete first set of virtual items determined by the virtual items module 113. That awarded virtual item is now removed from the complete first set, creating an incomplete first set of virtual items. The virtual items 113 module also associates a value with each virtual item contained in the first set. In further embodiments, virtual items 113 module determines a first values distribution for the virtual items in the first set. A values distribution is associated with the number of occurrences of a particular value within a set. In other embodiments, the game platform 101 may present successive virtual containers at pre-determined points during gameplay, which award the user with virtual items remaining in the incomplete first set of virtual items.

In step 203, the game platform 101 recognizes the end of a period and subsequently presents to the user another virtual container. The game platform 101 may be configured to calculate a period by using a criterion suited to the video game (e.g., real-world time, an achievement reached during gameplay, a number of instances of redeeming a virtual container, etc.). The period, in other embodiments, may have been input manually into the video game code. In another embodiment, the game platform 101 may be configured to determine the occurrence of an event (e.g., a game event, completion of a real-world time period, end of a period, completion of an in-game time period, an end to a season, debut of an expansion pack of virtual items, debut of new major video game content). In some embodiments, the completion of a period coincides with the occurrence of an event.

In step 205, the virtual items module 113 determines a second set of virtual items from which the other virtual container awards the user a virtual item. In some embodiments, the second set of virtual items is identical to the complete first set of virtual items, including the associated values for each virtual item. In other embodiments, the second set of virtual items contains the same items as the complete first set of virtual items, but the values for each virtual item in the second set differ from those in the first. In further embodiments, the second set of virtual items contains virtual items that differ entirely or in part with the virtual items contained in the original first set but retain the same distribution of values as determined for the first set. In further embodiments, virtual items 113 module determines a second values distribution for the virtual items in the second set. With step 207, the next period of gameplay begins.

Figure 3:
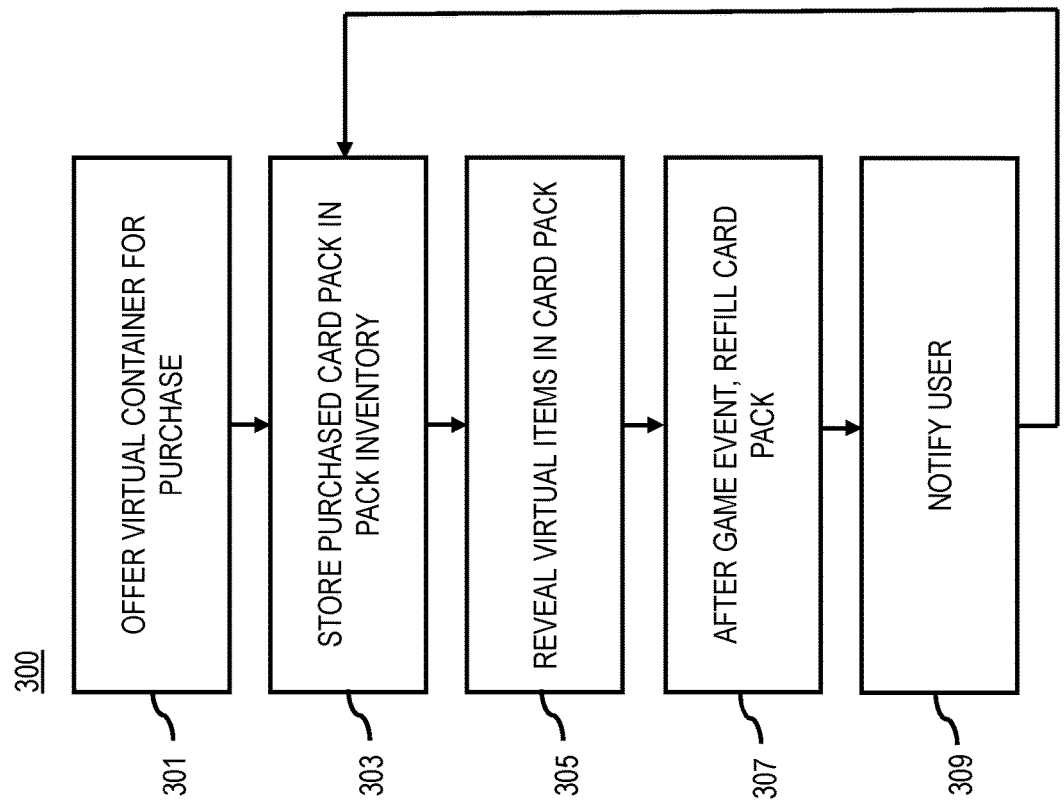
FIG. 3 depicts, in part, a method for presenting and refilling virtual purchased card packs according to an embodiment.

FIG. 3 is a flowchart of a process for incentivizing user participation in a video game according to an embodiment. In various embodiments, game platform 101, memory 107, processor 109, virtual container module 111, virtual items module 113, probabilities module 115, offer module 117, storage device 119, alone or in combination, may perform one or more portions of process 300 and may be implemented in, for instance, a chip set including a processor and memory. As such, game platform 101, memory 107, processor 109, virtual container module 111, virtual items module 113, probabilities module 115, offer module 117, storage device 119 and/or any of their component modules can provide means for accomplishing embodiments of other processes described herein in conjunction with other components of system 100. In addition, embodiments describing functions/actions related to game platform 101, memory 107, processor 109, virtual container module 111, virtual items module 113, probabilities module 115, offer module 117, storage device 119 individually is equally applicable to the other. Although process 300 is illustrated and described as a sequence of steps, it is contemplated that various embodiments of process 300 may be performed in any order or combination, may include additional steps, and need not include all of the illustrated steps.

In step 301, the offer module 117 may be configured to offer for purchase a virtual container containing with a first, or current, set of virtual items that, upon activation by a user, may be awarded to the user according to a probability distribution. According to an embodiment, the virtual container associates a set of virtual items that, upon activation by a user, may be awarded to the user according to a probability distribution. In an embodiment, the probability distribution may be determined by the probabilities module 115. In another embodiment, the probability distribution may be input by a video game programmer.

In step 303, the game platform 101 may be configured to store the virtual container in a virtual container inventory associated with the user. The virtual container inventory may be stored in memory 107. In another embodiment, the virtual container inventory maybe stored on the UE 123.

In step 305, the game platform 101 may be configured to, through the UE 123, reveal to the user the virtual items awarded to the user. The user may activate, through the UE 123, one or more virtual items to remove it from the virtual container and place it in a user inventory stored on the game platform 101.

In step 307, after completion of a period, the occurrence of an event, or some combination thereof, the game platform 101 may be configured to refill the virtual container with a second, or next, set of virtual items that, upon activation by a user, may be awarded to the user according to a probability distribution. According to an embodiment, the game platform 101 associates the virtual container with a second, or next, set of virtual items that, upon activation by a user, may be awarded to the user according to a probability distribution. In an embodiment, a game platform 101 configured to refill the virtual container may both refill the virtual container and replace at least one of the virtual items that remain from the first set of virtual items with different virtual items. In an embodiment, a game platform 101 configured to refill the virtual container may refill the virtual container with a second set of virtual items identical to the virtual items of the first set, except that the values of the virtual items in the second set differ from the values of the virtual items in the first set. In another embodiment, a game platform 101 configured to refill the virtual container may refill and supplement the virtual container with a second set of virtual items.

According to an embodiment, after completion of a period, the occurrence of an event, or some combination thereof, the game platform 101 may be configured to refill an empty virtual container (e.g., a virtual container with no virtual items remaining, a virtual container with all virtual items activated by the user), refill a virtual container with some virtual items remaining, or some combination thereof. In an embodiment, the game platform 101 may be configured to store a refilled virtual container in a virtual container inventory associated with a user. According to an exemplary implementation, an offer module may be configured to offer the user an option to refill a virtual container in exchange for some form of consideration (e.g., in-game currency, real-world currency, watching an advertisement, purchasing another product from the same software developer, serving as a community moderator, providing feedback, filling out a survey, reporting a bug, commending good user behavior, or reporting user misconduct). In yet another embodiment, the offer module may be configured to offer the user an option to refill a virtual container in exchange for the user making a charitable donation. In another implementation, the video game is designed to accommodate multiple users that compete against each other, and a refilling of a user's virtual container occurs just before, just as, or just after the game platform resets the game progression for each of the multiple users so that they are each equal to all other users in terms of game progression.

In step 309, the game platform 101 may be configured to notify the user, through the UE 123, of the refilled virtual container. According to an embodiment, the process repeats, at least in part, by returning to step 303 where a game platform 101 may be configured to store the virtual container in virtual container inventory associated with the user.

By way of non-limiting example, a video game may be configured to represent and present to the user virtual containers in the form of virtual card packs, which may, in some embodiments, resemble real-world trading card packs (e.g., baseball card packs, non-sports collectible card packs). The game platform for the video game may further be configured to present to the user a virtual card pack available for purchase with in-game currency, real-world currency, or a combination thereof. If the user purchases the virtual card pack, the game platform may further be configured to, upon the user activating the virtual card pack, reveal and award (e.g., open a pack, turn over a card) a first set of virtual items that appear, from the user's perspective, to be contained within the virtual card pack. The virtual card pack may not, in some embodiments, necessarily be configured to store the virtual items as code nor necessarily be hosted on the same hardware on which the virtual items are determined or stored. The game platform may be configured to present the virtual items as virtual cards to the user through a user equipment. The game platform may further be configured to allow the user to remove at least one of the virtual cards from the virtual card pack and place the virtual cards in a user inventory for use in the video game. The game platform may also be configured to detect the occurrence of at least one event (e.g., a game event, completion of a real-world time period, end of a period, completion of an in-game time period, an end to a season, debut of an expansion pack of virtual items, debut of new major video game content) during gameplay. After detecting an occurrence of the event, the game platform may be configured to present to the user the appearance of refilling the virtual card pack with a second set of virtual cards that may be awarded to the user upon activating the virtual card pack. In one embodiment, the second set of virtual cards may be identical to the first set of virtual cards. In another embodiment, the second set of virtual cards may be different, at least in part, from the first set of virtual cards. In an embodiment, after detecting an occurrence of an event, the game platform may be configured to present to the user the appearance of refilling and supplementing the virtual card pack with a second set of virtual cards. After refilling a virtual card pack, the game platform may be configured to notify the user of the refilled virtual card pack and store the virtual card pack in a virtual container inventory associated with the user. The user may then choose to activate the virtual card pack. In some embodiments, the game platform may present to the user a refilled virtual card pack that looks different in appearance from the original virtual card pack.

In some embodiments, the game platform may retain a record of the user's past virtual inventories. In those embodiments, the game platform may allow users to view past virtual items and a virtual inventory from a previous season, even if those virtual items are not part of the user's present virtual inventory.

Returning to FIG. 1, the game platform 101 may be configured to include virtual container mechanics that allow a user to activate a virtual container (e.g., loot box, gacha, chest, mystery box, treasure chest, item bundle, random box, booster pack, virtual card pack, prize wheel) if the user pays a specified price in some form of currency (e.g., cryptocurrency, in-game currency, official national currency). In other embodiments, the game platform 101 may be configured to allow a user to activate a virtual container if the user has watched an advertisement, or if the user has reached a particular achievement in the video game.

The game platform 101 may be a platform with multiple interconnected components. The game platform 101 may comprise one or more servers, intelligent networking devices, computing devices, components, and corresponding software. Though depicted as a separate entity in FIG. 1, it is contemplated that the game platform 101 may be implemented in the one or more modules or components shown in FIG. 1 including, but not limited to, UE 123, applications 125, memory 107, processor 109, storage device 119, or a combination thereof.

In one embodiment, the game platform 101 may be configured to allow a user to interact with the video game by moving through the video game environment, around the video game environment, clicking on various objects presented through the user interface such as boxes, characters, and virtual items, communicating with other users, participating in game mechanics, or some combination thereof as would be understood by a person of ordinary skill in the art. Communication with other users may include text chat, direct messages, private messages, voice communication, video communication, other modes of communication suitable for the game, or some combination thereof.

The system 100 includes a memory 107 according to an embodiment. The memory 107, such as a random access memory (RAM) or any other dynamic storage device, stores information including processor instructions for fully-automated learning to match heterogeneous feature spaces for mapping. Dynamic memory allows information stored therein to be changed by the system 100. RAM allows a unit of information stored at a location called a memory address to be stored and retrieved independently of information at neighboring addresses. The memory 107 is also used by the processor 109 to store temporary values during execution of processor instructions. The system 100 also includes a read only memory (ROM) 119 or any other static storage device for storing static information, including instructions, that is not changed by the system 100.

The system 100 comprises a storage device 119. The storage device 119 can be any form of storage medium including, but not limited to: random access memory (RAM), read-only memory (ROM), erasable programmable read-only memory (EPROM), a cache, a hard drive, a flash drive, a removable disk, a Secure Digital card (SD card), registers, and/or memory buffer or any combination thereof. The memory can be in communication with the processor such that the processor can read information from, and write information to, the memory.

In one instance, the game platform 101 comprises at least one server configured for hosting video games connected to a communication network 121, which may include one or more networks (e.g., data network, wireless network, telephony network, internet, local area network (LAN), metropolitan area network (MAN), wide area network (WAN), public data network, short-range wireless network). The communication network 121 may be wired, wireless, or any combination of wired and wireless communication networks, such as cellular, Wi-Fi, Bluetooth, internet, local area network (LAN), radio frequency signals, optical network. The one or more networks may also include any other suitable packet-switched network, such as commercially owned, proprietary packet-switched network (e.g., a proprietary cable or fiber-optic network). In addition, the communication network may be, as a non-limiting example, a cellular network and may employ various technologies alone or in combination including enhanced data rates for global evaluation (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), 5G broadband cellular networks (5G), wireless fidelity (Wi-Fi), wireless LAN (WLAN), Bluetooth®, Internet Protocol (IP) data casting, satellite, mobile ad-hoc network (MANET)).

The game platform 101, according to an embodiment, is configured to communicate with one or more user equipments (UE) 123 comprising one or more computing platforms (e.g., LINUX®, Windows 10', MacOS®, Android®, iOS®, Playstation®, Xbox®, Steam®). These UE 123 may include user interfaces or input devices (e.g., joystick, controller, keyboard, motion sensing device, touchscreen) that allow a user to interact with the video game. The UE 123 may further comprise The UE 123 may further comprise an application 125 with which a user may access one or more video games in addition to the video game hosted by game platform 101. The application 125 may include software, an application, a client, or distribution service hosted entirely on a user equipment 123, on game platform 101, the cloud, or some combination thereof. According to some embodiments, for multiplayer games, each player, or user, may be using their own user equipment within UE 123.

In some example embodiments, the UE 123 may include a mobile computing device such as a laptop computer, tablet computer, mobile phone, smart phone, navigation unit, personal data assistant, watch, camera, augmented reality interface, virtual reality interface, holographic interface, neural interface, or the like. Additionally or alternatively, the user interface may be a fixed computing device, such as a personal computer, computer workstation, kiosk, office terminal computer or system, or the like.

According to an embodiment, the game platform 101 may present a video game to the user via the user equipment 123. The video game in combination with the user equipment 123 may comprise a user interface that presents views of the video game to the user. The video game may comprise one or more graphical perspectives that are 2-dimensional, 3-dimensional, or some combination thereof. The graphical perspective may present the video game suitable for the genre of the game. In a non-limiting example, if the genre of the game involves a soccer, or association football, teams playing in a virtual league, then the graphical perspective may contain, among other things, elements of a soccer field, a list of a soccer team's roster including players and coaches, team statistics, a team's season record, or some combination thereof. The graphical perspective may comprise many other elements (e.g., animation, augmented reality, changing landscapes, avatars) in other embodiments, which are only limited by a video game programmer's imagination.

According to an embodiment, the game platform 101 may be configured to execute or allow the user to experience a particular genre or style of game such as role-playing game (RPG), first-person shooter (FPS), massively multiplayer online games (MMO), auto-chess games, battle royale games, cooperative games, player versus environment (PvE), player versus player (PvP), strategy, sports, simulation, role-playing, racing, puzzle, fighting, adventure, action, fantasy, or any combination thereof. In an embodiment, the game platform 101 may be configured to define gameplay or the ways in which a user interacts with the game (e.g., the ways in which a user plays the game, experiences the game, understands the objectives of the game, strategizes in the game).

A processor 109 (or multiple processors) performs a set of operations, instructions, or code on information related to executing a video game. The processor can be any suitable processing device configured to run or execute a set of instructions or code (e.g., stored in the memory) such as a central processing unit (CPU), general purpose processor (GPP), a graphics processor unit (GPU), a digital signal processor (DSP), an application specific integrates circuit (ASIC), a field programmable gate array (FPGA), or any other programmable logic device, discrete gate or transistor logic, discrete hardware components, controller, microcontroller, or any combination thereof designed to perform the functions described herein. For example, a processor can be implemented as a combination of a DSP and a microprocessor, a plurality of microprocessors, one or more microprocessors in conjunction with a DSP core, or any other such configuration.

Computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). Each operation of the set of operations that can be performed by the processor is represented to the processor by information called instructions, such as an operation code of one or more digits. A sequence of operations to be executed by the processor such as a sequence of operation codes, constitute processor instructions, also called computer system instructions or, simply, computer instructions. Processors may be implemented as mechanical, electrical, magnetic, optical, chemical or quantum components, among others, alone or in combination.

In some example embodiments a computer program product is provided. The computer program product comprises at least one non-transitory computer-readable storage medium having computer-executable program code instructions stored therein, the computer-executable program code instructions comprising program code instructions for receiving information related to the movement and position of a training device. The computer-executable program code instructions may further comprise program code instructions for extracting information related to the motion and position of the training device. The computer-executable program code instructions may further comprise program code instructions for calculating information related to motion and position of the training device (e.g., angular velocity, linear velocity, revolutions per minute, orientation of the rotation axis, orientation of the spin axis).

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A system for incentivizing user participation with a video game, the system comprising:
    at least one processor;
    at least one memory;
    the processor configured by machine-readable instructions to:
        present a virtual container that awards a user at least one virtual item from a first set of virtual items upon activation by the user,
            wherein each virtual item in the first set comprises a probability that each virtual item will be awarded to the user according to a first probability distribution,
        associate the virtual container with the user in a user virtual inventory, and
        in response to a game event, refill the virtual container with a second set of virtual items so that the virtual container awards the user at least one virtual item from the second set of virtual items upon reopening the virtual container,
            wherein each virtual item in the second set comprises a probability that each virtual item will be awarded to the user according to a second probability distribution.

2. The system of claim 1, further comprising at least one other user, wherein in response to the game event, the system refills a second virtual container associated with a second user in a second user virtual inventory.

3. The system of claim 1, wherein the game event consists of a completion of a real-world time period.

4. The system of claim 1, wherein the game event consists of an achievement reached during gameplay.

5. The system of claim 1, wherein the second probability distribution is identical to the first probability distribution.

6. The system of claim 1, further comprising at least one other user and a game progress for each of the user and the at least one other user, wherein after the game event, the video game resets all the game progress of all users.

7. The system of claim 1, wherein the system further comprises one or more intervening virtual containers presented to the user between the presentation and refill of the virtual container, wherein each intervening virtual container awards virtual items according to a preset order.

8. The system of claim 1, wherein the system further comprises at least one other user, and is further configured to determine an item-value probability distribution to award the user and the at least one other user with roughly equivalent numbers and values of virtual items.

9. The system of claim 1, wherein the system further comprises at least one other user, and, in response to the virtual item being awarded to the user, the system is further configured to reduce the probability of that item being awarded to the at least one other user to zero.

10. The system of claim 1, wherein the system further determines a values distribution associated with the number of occurrences of a value within a set.

11. A computer-implemented method for incentivizing user engagement with a video game comprising:
    presenting, by at least one processor, a virtual container that awards a user at least one virtual item from a first set of virtual items upon activation by the user, wherein each virtual item in the first set comprises a probability that each virtual item will be awarded to the user according to a first probability distribution;
    associating the virtual container with the user in a user virtual inventory; and
    refilling, in response to a game event, the virtual container with at least one virtual item from a second set of virtual items so that the virtual container awards the user the at least one virtual item from the second set of virtual items upon reopening the virtual container, wherein each virtual item in the second set comprises a probability that each virtual item will be awarded to the user according to a second probability distribution.

12. The method of claim 11, further comprising at least one other user, wherein in response to the game event, the system refills a second virtual container associated with a second user in a second user virtual inventory.

13. The method of claim 11, wherein the game event consists of a completion of a real-world time period.

14. The method of claim 11, wherein the game event consists of an achievement reached during gameplay.

15. The method of claim 11, wherein the second probability distribution is identical to the first probability distribution.

16. The method of claim 11, further comprising at least one other user and a game progress for each of the user and the at least one other user, wherein after the game event, the video game resets all the game progress of all users.

17. The method of claim 11, further comprising presenting one or more intervening virtual containers to the user between the presenting and refilling of the virtual container, wherein each intervening virtual container awards virtual items according to a preset order.

18. The method of claim 11, further comprising determining an item-value probability distribution to award the user and at least one other user with equivalent quantities and values of virtual items.

19. The method of claim 11, further comprising, in response to the virtual item being awarded to the user, reducing a probability of that item being awarded to at least one other user to zero.

20. The method of claim 11, further comprising determining a values distribution associated with the number of occurrences of a value within a set.

\* \* \* \* \*